US007661184B2

United States Patent
Putnam et al.

(10) Patent No.: US 7,661,184 B2
(45) Date of Patent: Feb. 16, 2010

(54) LOAD APPLYING TOOL

(75) Inventors: Gary Putnam, Girard, OH (US);
Charles G. Falletta, Eastlake, OH (US);
Thomas Lippucci, Seven Hills, OH
(US); John Carrus, Mentor, OH (US);
Wayne Ostrosky, Novelty, OH (US)

(73) Assignee: Swagelok Company, Solon, OH (US)

( * ) Notice: Subject to any disclaimer, the term of this patent is extended or adjusted under 35 U.S.C. 154(b) by 684 days.

(21) Appl. No.: 10/995,711

(22) Filed: Nov. 23, 2004

(65) Prior Publication Data

US 2005/0210648 A1 Sep. 29, 2005

Related U.S. Application Data

(60) Provisional application No. 60/481,705, filed on Nov. 26, 2003.

(51) Int. Cl.
*B23Q 17/00* (2006.01)
*B23P 21/00* (2006.01)
(52) U.S. Cl. .................. 29/407.08; 29/707
(58) Field of Classification Search ............ 29/213.1, 29/407.01, 407.05, 407.08, 407.02, 700, 29/705, 707, 712, 720, 215; 73/780, 862.337
See application file for complete search history.

(56) References Cited

U.S. PATENT DOCUMENTS 4,685,488 A  8/1987  Corbin et al.

FOREIGN PATENT DOCUMENTS

| DE | 4318157 | 12/1994 |
|---|---|---|
| DE | 4404919 | 8/1995 |
| DE | 19623360 | 1/1998 |
| WO | WO 98/58198 | 12/1998 |

OTHER PUBLICATIONS

International Search Report from PCT/US2004/039513.
Brochure "Springless Diaphragm Valves for High Performance", www.swagelok.com, 2002, 2004, printed U.S.A.
Brochure "IGC II Integrated Gas Components, Substrates, Manifolds, Mounting Components, and Assembly Hardware", www.swagelok.com, 2001, 2003, printed U.S.A.
Brochure "Semiconductor, Fluid System Components", www.swagelok.com, 2003, printed U.S.A.
Brochure "Integral-Bonnet Needle Valves", www.swagelok.com, 2001, 2002, 2003, printed U.S.A.

*Primary Examiner*—John C Hong
(74) *Attorney, Agent, or Firm*—Calfee, Halter & Griswold LLP (57) ABSTRACT

A method and apparatus for setting a desired load applied to a device such as a valve. A tool is applied to the valve. Force applied to the tool is transmitted to the valve packing. A selected load force is applied to the tool. The packing is secured to set the selected load force applied to the packing. The tool may be removed from the valve.

24 Claims, 6 Drawing Sheets

LOAD APPLYING TOOL

RELATED APPLICATIONS

The present application claims priority from provisional application Ser. No. 60/481,705, entitled "Load Applying Tool and Method," filed on Nov. 26, 2003.

FIELD OF THE INVENTION

The present invention relates to a method and apparatus for setting a load that is applied to a device. In particular, the invention relates to a method and apparatus for setting a load that is applied to a packing in a valve.

BACKGROUND OF THE INVENTION

Some known rotary valves include a housing and a ball supported for rotation in a chamber in the housing. Rotation of the ball in the housing, through rotary force applied to a valve stem, controls fluid flow through the valve. A packing is interposed between the ball and the housing to help seal the chamber. A stack of Belleville springs, between a top gland and a bottom gland, exerts a force (a "live load") on the packing. The stack of springs is secured in the housing by a packing bolt that is screwed into the housing. The springs maintain load on the packing and thus can compensate for material creep in the valve and temperature variations.

Setting the proper load on the springs can be important to ensure proper functioning and life of the valve. The packing bolt needs to be screwed in by the proper amount so that a specific and accurate load is applied to the springs and thus to the packing, to create an optimal seal for thermal cycle capability and room temperature cycle life.

The proper load setting has been achieved in the past by screwing the packing bolt in until it contacts the top gland, then rotating the bolt a predetermined number of degrees. Another way the proper load setting has been achieved is by screwing the bolt in until it contacts the top gland, then rotating the bolt until it moves axially by a predetermined distance after it contacts the top gland. Although these methods work, they are dependent on human interaction to find the starting point where the bolt first makes contact. As a result, these methods are not easily amenable to cost effective process control in a production environment. The present invention addresses these needs.

SUMMARY

The present invention relates to a method and apparatus for setting a desired load applied to a device such as a valve and, in particular, to a packing or other loaded structure in a valve. The disclosed methods and apparatuses are applicable to live loading packing of valves of different types, for setting the load of valves not having a live load, and also to the loading of a device other than a valve. The disclosed methods and apparatuses have applicability outside the area of loading a packing in a valve. For example, the disclosed methods and apparatuses may replace a torque wrench or torque motor in other applications.

According to one method of setting a load force applied to valve packing to a selectable value, a tool is applied to the valve. Force applied to the tool is transmitted to the valve packing. A selectable load force is applied to the tool. The packing is secured to set the selected load force applied to the packing. The tool may be removed from the valve.

According to one method of setting a load force applied to valve packing to a selected value, a tool is applied to the valve to engage a force transfer member. Force applied to the tool is transmitted to the valve packing by the force transfer member. A selected load force is applied to the tool. A loaded position, where the force transfer member is located when the selected load force is applied to the tool, is determined. The tool is removed. The force transfer member is secured at the loaded position to set the load force applied to the packing at the selected value.

One tool for setting a load force applied to valve packing to a selectable value includes an engagement member, a measuring device, and a load applying device. The engagement member is configured for insertion into a valve opening. The engagement member transmits force applied to the tool to the valve packing. The measuring device measures a load force applied to the engagement member. The load applying device applies the load force to the engagement member.

Further advantages and benefits will become apparent to those skilled in the art after considering the following description and appended claims in conjunction with the accompanying drawings.

DETAILED DESCRIPTION

The present invention relates to a method and apparatus for setting a desired load that is applied to a device such as a valve and, for example, to a packing in a valve. The present invention is applicable to loading of valves of different types, for setting the load of valves not having a live load, and also to the loading of a device other than a valve. The present invention has applicability outside the area of loading a packing in a valve. For example, the present invention may in other uses replace a torque wrench or torque motor.

While the described embodiments herein are presented in the context of setting a load applied to a valve, those skilled in the art will readily appreciate that the present invention may be used in many different applications where an axial force is applied by rotating a fastener, including but not limited in any manner to any: measuring a force applied to a component by a fastener, and setting a force applied to a component by a fastener. These examples are intended to illustrate the broad application of the invention for setting and/or measuring force applied by a fastener. The specific design and operation of the method and tool for applying a load force provides no limitation on the present invention except as otherwise expressly noted herein.

Figure 1:
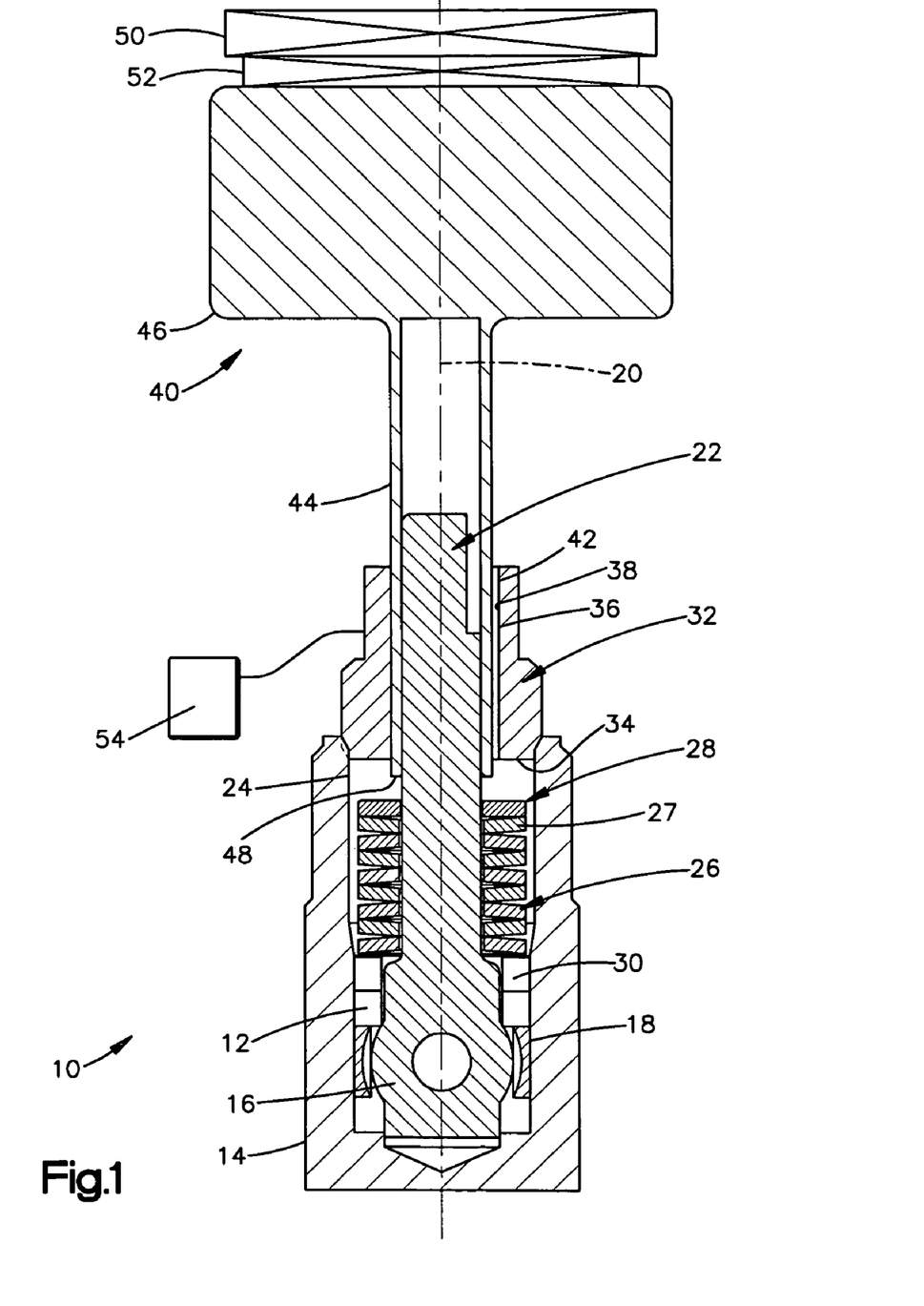
FIG. 1 is a sectional view of a load application and measurement tool applied to a valve.

FIG. 1 schematically illustrates an example of a load application and measurement tool for loading a valve 10, in accordance with a first embodiment of the invention. The valve may be, for example, of the general type shown in U.S. Pat. No. 4,685,488 (herein "the '488 patent"), the disclosure of which is hereby incorporated by reference. It should be readily apparent that the '488 patent provides but one example of a valve that the tool 10 could be used with. The tool 10 could be used with a variety of different types of valves. The tool 10 could be used to set and/or measure a force applied by a fastening member to a component of any type of valve. In the illustrated valve 10, a packing 12 in a housing 14 supports a ball 16 for rotation in a chamber 18 about an axis 20. The ball 16 is fixed to, or formed as one piece with, a cylindrical valve stem 22 that extends through an opening 24 in the housing 14. The stem 22 is rotatable about the axis 20, by an actuator (not shown), to effect rotation of the ball 16. Rotation of the ball 16 in the chamber 18 in the housing 14 controls fluid flow through the valve 10, in a known manner.

In the example of FIG. 1, the packing 12 is loaded by a stack of Belleville springs 26 located between top and bottom glands 28 and 30 in the housing 14. The springs 26 have annular configurations extending around the valve stem 22. The springs 26 act through the bottom gland 30 to load the packing 12. It should be apparent that the packing 12 could be loaded in a variety of different ways. For example, the load could be applied directly to the packing.

The springs 26 are secured in the housing 14 by a fastening member 32, which in the illustrated embodiment is a packing bolt. The packing bolt 32 is threadedly engaged in the housing 14. Rotation of the packing bolt 32 about the axis 20 effects movement of the packing bolt relative to the housing 14 in a direction parallel to the axis. The packing bolt 32 has an external hex configuration to enable gripping and rotation of the packing bolt with a wrench or other tool. The packing bolt 32 has a radially extending inner end surface 34 that is engageable with a force transfer member to maintain compressive force on the packing. In the illustrated valve, the force transfer member is the top gland 28 that transfers the force applied by the packing bolt 32 to the springs 26 and the packing 12. In other valves, a top gland may not be included and the transfer member is a top spring 27. In these valves, the fastener 32 engages the top spring 27 and transfers the force applied by the fastener 32 to the springs 26 and the packing 12.

In the example of FIG. 1, the packing bolt 32 has a cylindrical, axially extending inner side surface 36 that defines a central opening 38 through which the valve stem 22 extends for engagement by the actuator of the valve 10. In the example of FIG. 1, a valve opening 42 is defined by the valve stem and the central opening 38. In the example of FIG. 1, the valve opening 42 is an annular space defined by the outer surface of the valve stem 22 and the inner side surface 36 of the packing bolt 32.

The load on the packing 12 may be set with the use of a tool 40 as shown in one embodiment in FIG. 1. FIG. 1 illustrates an example of a tool 40 for setting a load force applied to valve packing 12 to a user selected value. The tool 40 includes an engagement member 44, a measuring device 52, and a load applying device 50. The engagement member is configured for insertion into the valve opening 42 and to transmit force applied to the tool to the valve packing 12. In the example of FIG. 1, the central opening 38 of the packing bolt 32 is large enough to receive the tool 40 in addition to the valve stem 22. The measuring device 52 measures a load force applied to the engagement member. The load applying device 50 applies the load force to the engagement member.

In the example of FIG. 1, the engagement member 44 of the tool 40 is configured to pass through a packing bolt. The engagement member could pass through the packing bolt 32 in a variety of different ways. In the Example of FIG. 1, the engagement member 44 has an elongate tubular configuration adapted to fit into the annular space 42 between the packing bolt 32 and the valve stem 22. The exemplary engagement member 44 of the tool 40 has an annular inner end face 48 adapted to engage the force transfer member, which is the top gland 28 in the illustrated embodiment. The tool thereby applies load to the top gland 28, the springs 26, and the packing. It should be understood that a tool of the present invention can be used to contact springs or another member that transfers the force to the packing rather than the gland.

In the example of FIG. 1, during assembly and loading of the valve 10, the engagement member 44 of the tool 40 is inserted into the annular space 42 between the packing bolt 32 and the valve stem 22 until the inner end face 48 of the tool engages the top gland 28. Axial load, or force, is applied to a force application member 46 of the tool 40 by a load-applying device or press indicated schematically at 50. In a preferred embodiment, the load-applying device 50 is electric; it could, alternatively, be hydraulic, or pneumatic, or manual, or of any other suitable type. The load is transferred through the force application member 46 of the tool 40 to the engagement member 44 of the tool. The inner end face 48 of the engagement member 44 of the tool 40 transmits the load to the top gland 28 and into the springs 26. The load is transmitted through the springs 26 and the bottom gland 30 and into the packing 12.

The force application member 46 of the tool 40 is adapted to receive or engage a load cell or other suitable measuring device indicated schematically at 52. In the embodiment shown in FIG. 1, the measuring device 52 is interposed between the load applying device 50 and the tool 40. It should be understood that the measuring device 52 can be positioned elsewhere; for example, the measuring device might be incorporated in the press or other load-applying device 50.

In the assembly process, an increasing load is applied by the load-applying device 50. This load is resisted by the springs 26 and the packing 12. The applied load is measured by the measuring device 52. The measuring device 52 is electrically connected with the load-applying device 50, in a manner so that the operation of the load-applying device is controlled by the measured load. When the desired load on the springs 26 is attained, as measured by the measuring device 52, the operation of the load applying device 50 is controlled to cease applying further load. The load on the tool 40 and thus the load on the packing 12 are set at the desired amount selected by the user.

After the desired load on the packing 12 is thus attained, the packing bolt 32 is screwed into the housing. This movement of the packing bolt 32 may be accomplished manually or in another manner. In the illustrated embodiment, a motorized fastening socket or other electrically controllable tool, shown schematically at 54, is used to screw the packing bolt 32 into the housing 14. The packing bolt 32 moves axially into the housing 14 until the inner end surface 34 of the packing bolt engages the top gland 28.

When the packing bolt 32 engages the top gland 28, the springs 26 begin to compress further. The resistive load on the engagement member 44 of the tool 40 decreases. This decrease is evidenced at the measuring device 52. A signal indicative of this decrease is sent to the drive motor of the fastening socket 54. The motor is stopped in response (or rotation of the packing bolt 32 is otherwise stopped). As a result, the packing bolt 32 is positioned to set the measured, desired load on the springs 26 and the packing 12.

The present invention provides an accurate measurement of the axial load that is applied to the force application member 46 of the tool 40, and thus an accurate measurement of the axial load that is applied to the packing 12. The invention also provides an accurate method of positioning the packing bolt 32 in response to the measured load, and of setting that load while the packing bolt is positioned.

In one embodiment, the tool 40 is used to check or measure the load on the packing 12 of an assembled valve 10 with the packing bolt 32 is screwed in. The load is checked or measured by inserting the tool 40 into the value and measuring the load needed to cause the tool to begin compressing the springs 26 further. The load that is needed to begin compression of the springs further is equal (or just higher) than the load applied by the fastener.

In the exemplary embodiment, the load application and measurement is electrically controlled by a direct measurement of the load on the springs 26. Electrical control of the load application is amenable to consistent, repeatable, measurable performance and assures that the valve 10 is constructed with the intended load on the packing 12. In the exemplary embodiment, the load is directly measurable, both during assembly of the valve 10 and after assembly, by inserting the tool 40 between the packing bolt 32 and the stem 22. Any given load can be easily and accurately be provided for the valve 10 and can be measured after assembly of the valve.

Figure 2:
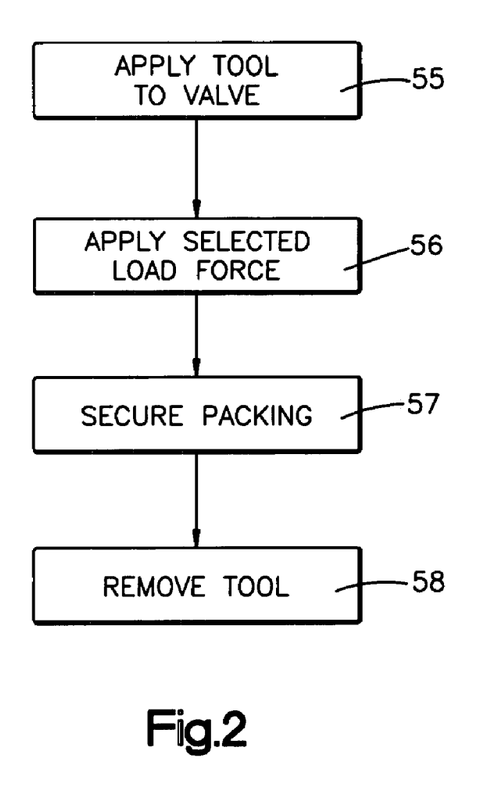
FIG. 2 is a flow chart that illustrates a method of setting a load force applied to valve packing to a selectable value.

FIG. 2 is a flow chart that illustrates a method of setting a load force applied to valve packing to a selected value. In the method, a tool is applied 55 to the valve, such that force applied to the tool is transmitted to the valve packing 12. A selected load force is applied 56 to the tool. The packing is secured 57 to set the selected load force applied to the packing 12. The tool may then be removed 58 from the valve 10.

Figure 3:
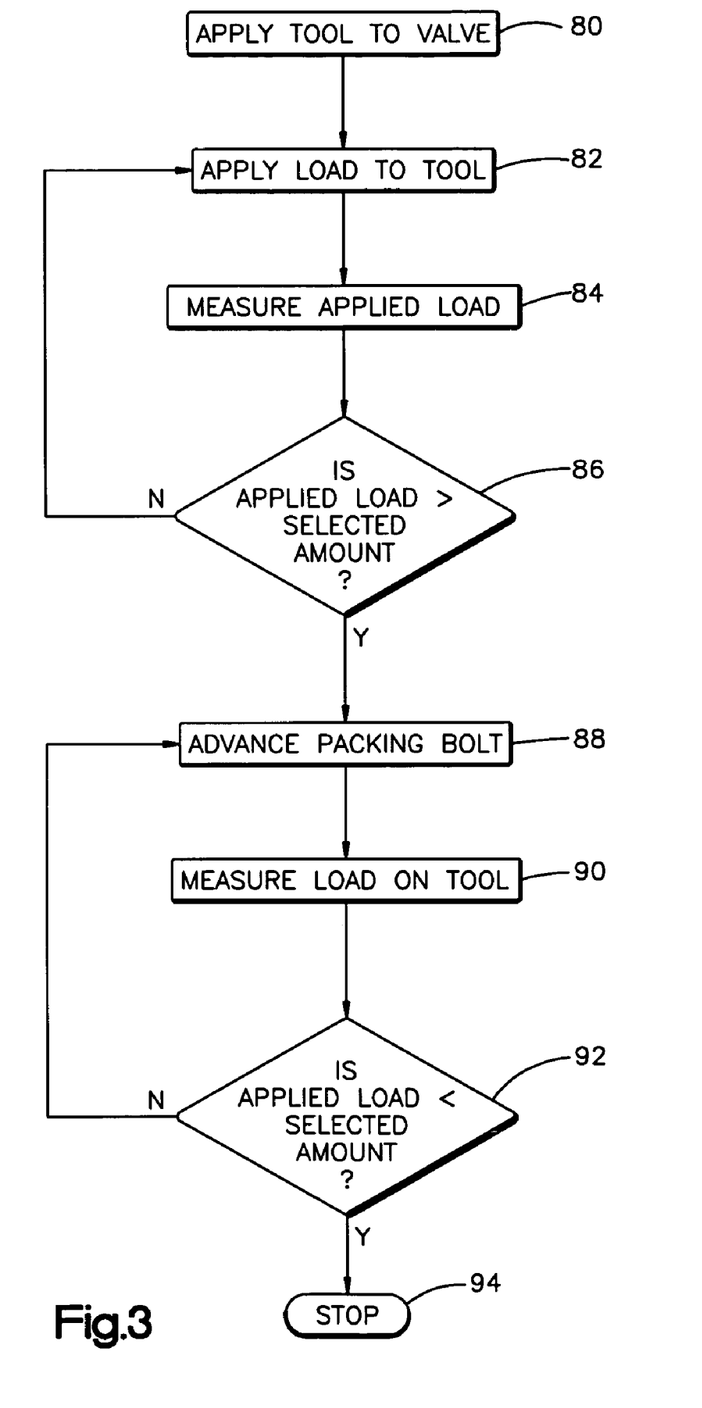
FIG. 3 is a flow chart that illustrates a method of setting a load force applied to valve packing to a selectable value.

FIG. 3 is a flow chart that illustrates a method of setting a load force applied to valve packing to a selected value, applied to the exemplary tool 40 and valve 10 illustrated by FIG. 1. At step 80, the tool is applied to the packing in the valve. At step 82, axially directed load is applied to the tool and thus to the packing.

At step 84, the applied load is measured. At step 86, a determination is made as to whether the applied load is greater than a selected amount. If the determination is negative, the more load is applied at step 82. If the determination is positive, the position of the tool is maintained with respect to the valve to maintain the measured load applied to the tool and the packing bolt is screwed in farther at step 88.

At step 90, the load on the tool is measured. At step 92, a determination is made as to whether the applied load is greater than the selected amount. If the determination is negative, the process loops back to step 88 and the packing bolt continues to be screwed in, increasing the load on the packing. If the determination is positive which indicates that the packing bolt has engaged the packing, the process continues to step 94, at which the process is stopped. The tool can then be removed from the tool. The packing bolt maintains application of the selected force to the packing.

Figure 4:
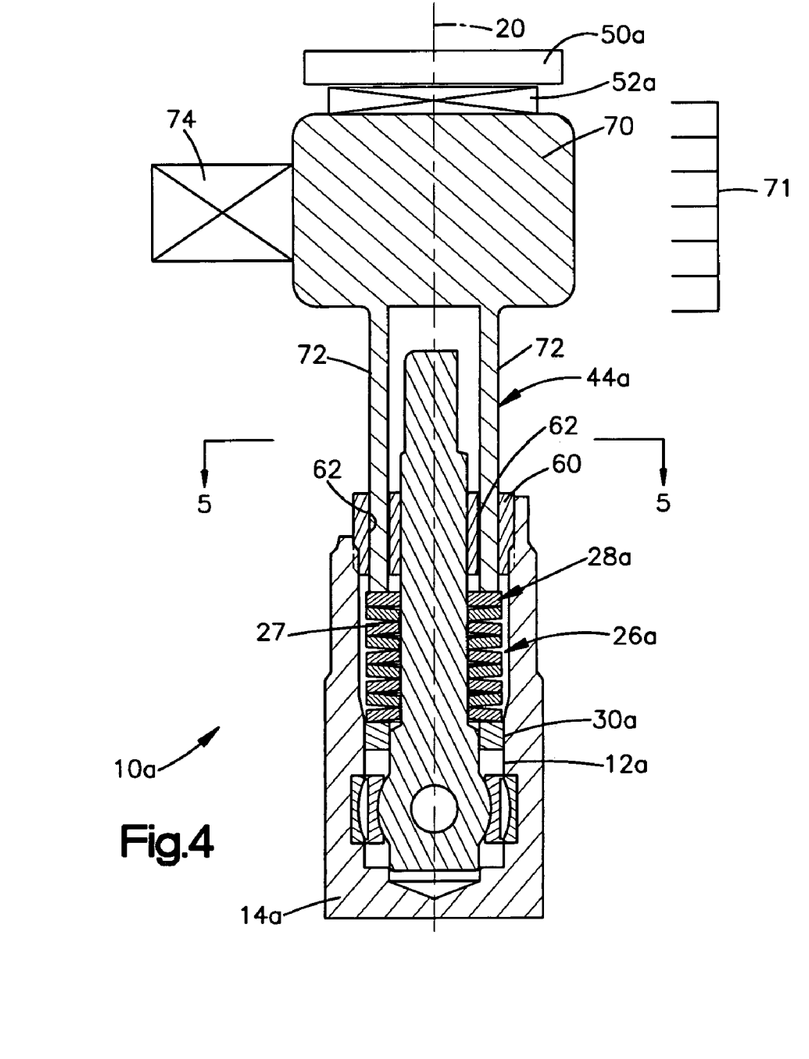
FIG. 4 is a sectional view of a load application and measurement tool applied to a valve.
Figure 5:
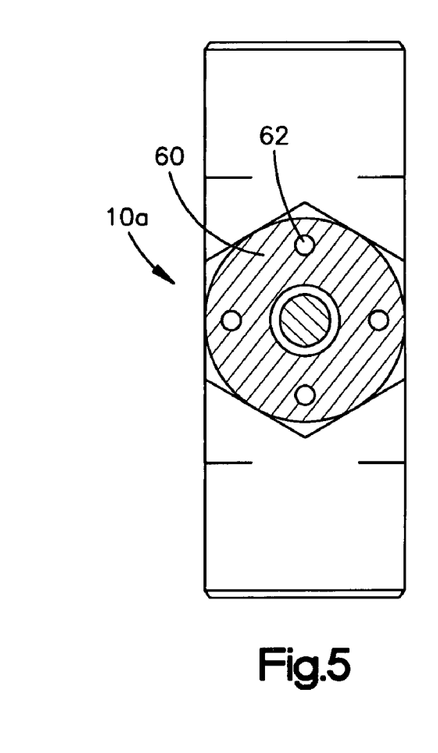
FIG. 5 is a view of the valve illustrated in FIG. 4 taken along lines 5-5 in FIG. 4.

FIGS. 4 and 5 illustrate a load application and measurement tool 70 in accordance with a second embodiment of the invention. In the second embodiment, the valve 10a has a different packing bolt 60. Specifically, the packing bolt 60, instead of having a central opening through which a tool is inserted to apply the load, has a plurality of small, circular, axially extending pin openings 62. The pin openings 62 are spaced apart in a circular array centered on the axis 20, as in a spanner nut.

The illustrated tool 70 includes an engagement member 44a, a measuring device 52a, a load applying device 50a, and a rotary drive device 74. The engagement member 44a has a corresponding array of circular load-applying pins 72 that are adapted to extend through the pin openings 62 in the packing bolt 60, as in a spanner wrench. The tool 70 acts not only as a load-applying device but also as a tool for rotating the packing bolt 60.

In assembly and loading of the valve 10a, the packing bolt 60 is initially threaded into the housing 14a, but not to the point at which it would contact the top gland 28a.

The tool 70 is moved axially downward until the ends of the pins 72 engage the top gland 28a. The load is steadily increased, compressing the springs 26a, and loading the packing 12a. The load on the packing 12a is sensed, as an increasing load is applied, until the measuring device 52a indicates that a selected load is applied. The axial movement of the tool 70 is then stopped.

The vertical position of the tool 70 is then maintained, while the tool is rotated by a drive device 74. For example, the load applying device may be a motorized fastening tool. In one embodiment, the drive device 74 also includes a load sensor, such as a torque wrench. When the tool 70 is rotated, the engagement of the pins 72 of the tool in the pin openings 62 of the packing bolt 60 causes the rotating tool to drive the packing bolt for rotation about the axis 20.

As the packing bolt 60 rotates, it moves axially more deeply into the housing 14a, engaging the top gland 28a. Rotation of the tool 70 is stopped in response, and the bolt 60 is properly positioned for the desired load on the packing 12a. One possible drawback of this mode of operation is that the ends of the pins 72 rotate along the top gland 28a during rotation of the packing bolt.

Figure 6:
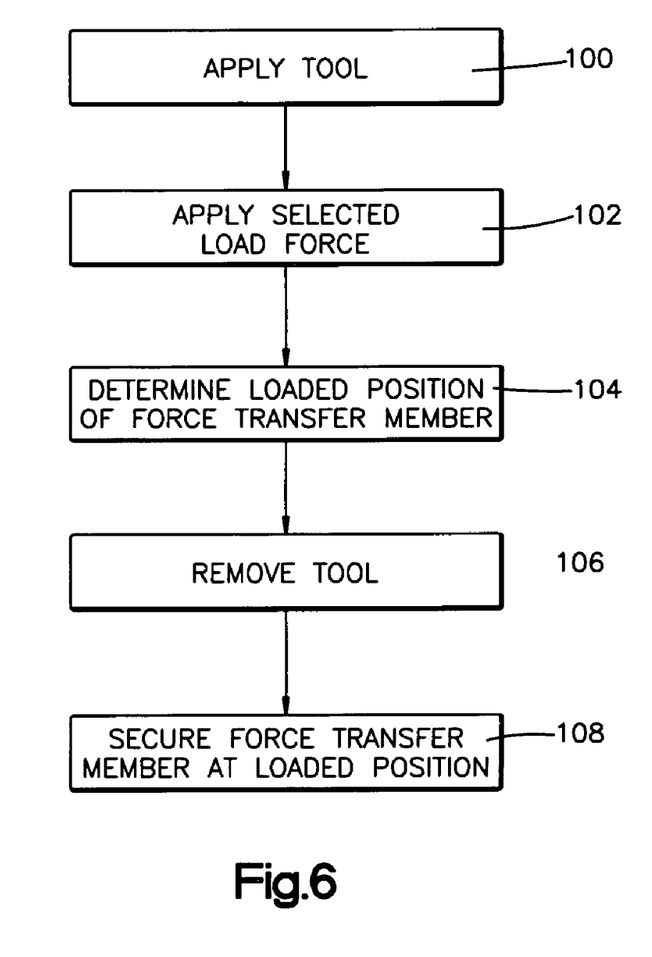
FIG. 6 is a flow chart that illustrates a method of setting a load force applied to valve packing to a selectable value.

FIG. 6 illustrates a method of setting a load force applied to a valve packing by a force transfer member to a selected value, where the tool is removed from engagement with the force transfer member before the force transfer member is secured. In the method of FIG. 6, a tool 40, 70 is applied 100 to the valve 10 to engage the force transfer member. Force applied to the tool is transmitted to the valve packing 12 by the force transfer member. The appropriate selected load force is applied 102 to the tool. A loaded position of the force transfer member is determined 104 when the selected load force is applied to the tool. The tool is removed 106 from engagement with the force transfer member. The force transfer member is secured 108 at the loaded position to set the load force applied to the packing at the selected value.

Figure 7:
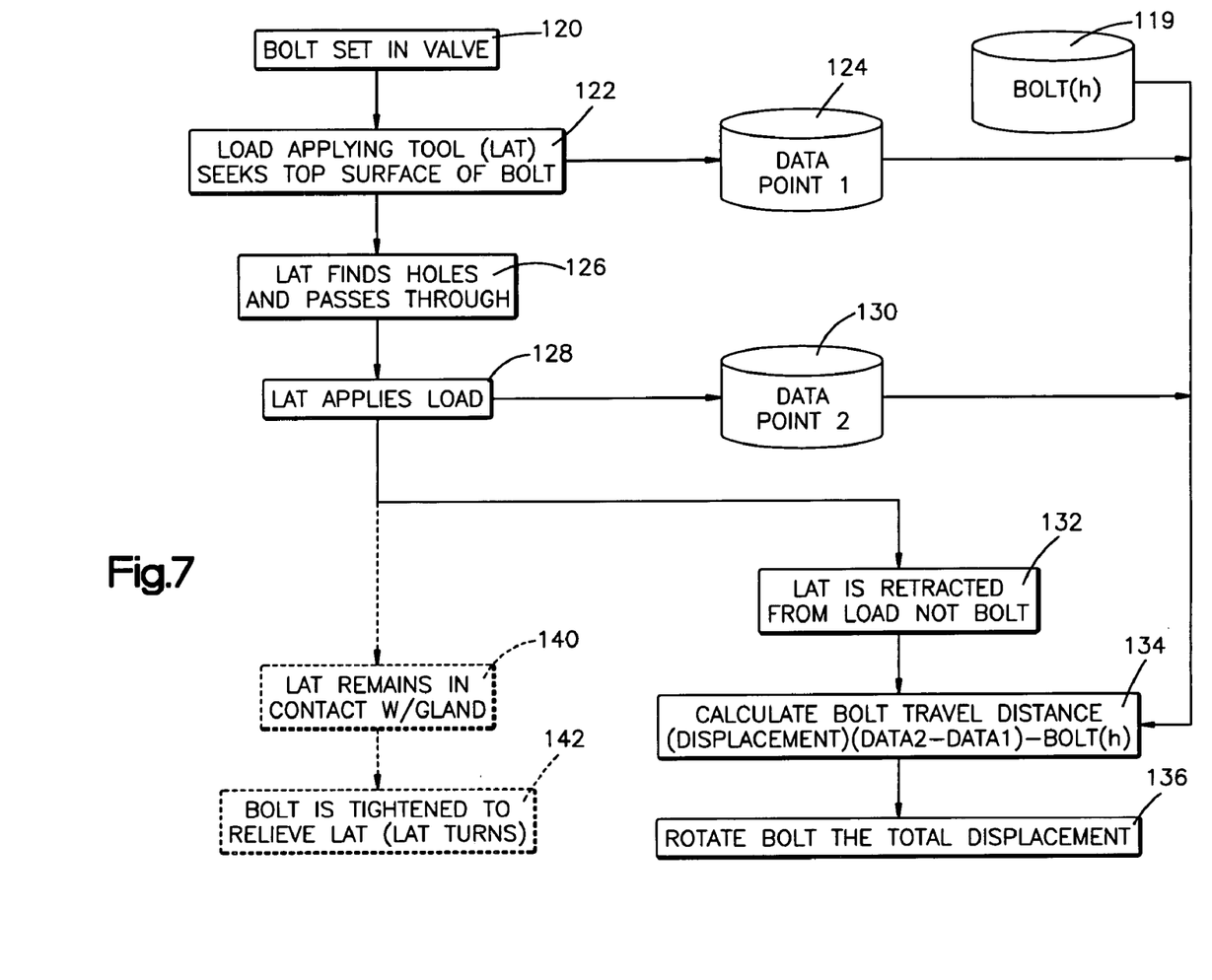
FIG. 7 is a flow chart that illustrates a method of setting a load force applied to valve packing to a selectable value.

FIG. 7 illustrates an exemplary method of setting a load force applied to a valve packing by a force transfer member to a selected value, where the tool is removed from engagement with the force transfer member before the force transfer member is secured applied to the tool 70 and valve 10a illustrated by FIG. 4. In the method illustrated by FIG. 7, the height of the packing bolt is determined 119 prior to inserting it into the valve. The bolt is set 120 (i.e. partially threaded) into the valve and the load applying tool is moved 122 downward until it engages the top surface of the bolt. This data point, specifically, the displacement (position) of the load applying tool, is then recorded 124, as against a scale shown schematically at 71 in FIG. 4, for example.

The load applying tool is then rotated until the pins align 126 with and enter the pin openings in the bolt. The rotation of the load applying tool is then interrupted and the load applying tool is moved only axially until the desired load is set 128 on the packing. When that point is reached a second data point, again the displacement (position) of the tool, is recorded 130.

Two options then exist for securing the packing with the bolt. According to one option shown in (solid lines in FIG. 7) the load-applying tool is removed from the valve before the parking bolt is tightened. In the exemplary embodiment, the load applying tool is retracted 132 from the top gland but not from the packing bolt. The amount of bolt travel that is needed to have the bolt engage the top gland and compress the stack of springs to the desired load is calculated 134 using the bolt height and the recorded data points. The bolt is then rotated 136 until it moves by the required displacement. With this option, more measurements and calculations are needed than if the tool is maintained in contact with the force transfer member during tightening of the fastener.

In the second option for completing the securing of the force transfer member (shown in phantom lines in FIG. 7), the load applying tool remains 140 in contact with the top gland, and is rotated along with the packing bolt to tighten 142 the packing bolt. When the load on the tool begins to decreased, the desired load has been reached and the rotation of the packing bolt is stopped. The tool remains in contact with the top gland during this portion of the operation. As noted above, a possible drawback of this mode of operation is that the ends of the pins rotate along the top gland during rotation of the packing bolt.

Figure 8:
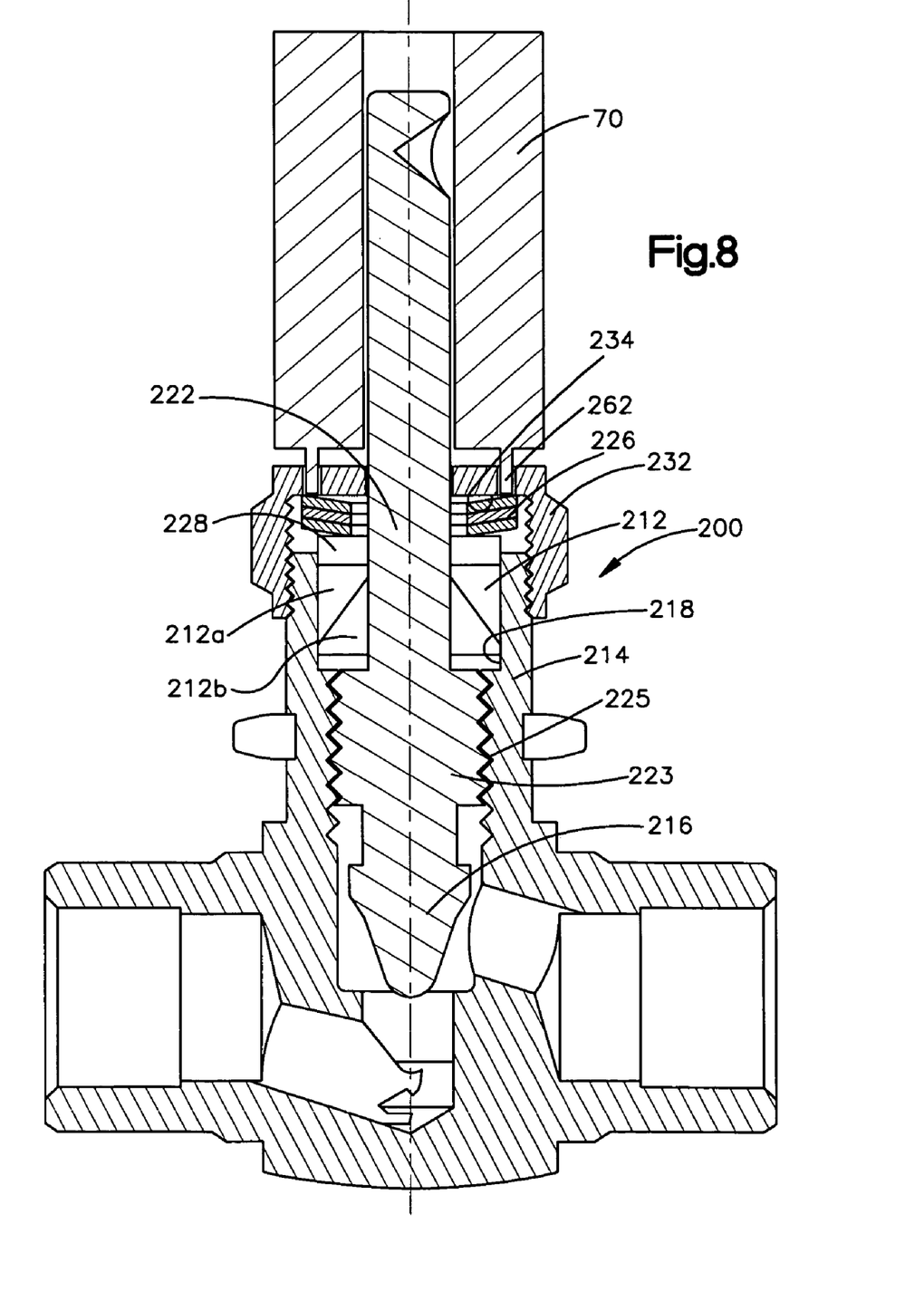
FIG. 8 is a sectional view of a load application and measurement tool applied to a valve.

The disclosed tools may be used to set a selected load to packing in a variety of different types of valves. FIG. 8 illustrates use of the packing tool 70 to apply a selected load to a needle valve 200. In the needle valve 200, a packing 212 in a housing 214 provides a seal between a cylindrical valve stem 222 and a chamber wall 218. The valve stem 222 includes a threaded portion 223 and a valve stem tip 216. The stem 222 is rotatable about an axis 220 by actuator (not shown), to effect rotation of the threaded portion 223. The threaded portion 223 engages threads 225 in the housing 214 to cause axial movement of the valve stem tip 216 in the housing to control fluid flow through the valve 10, in a known manner.

In the example of FIG. 8, the packing 212 comprises a pair of wedge shaped packing members 212a, 212b. Axial force applied to the packing members 212a, 212b causes the packing members 212a, 212b to engage the valve stem 222 and the chamber 218. In the example of FIG. 8, the packing 212 is located between top and bottom glands 228 and 230 in the housing 214. The packing is loaded by a stack of Belleville springs 226 located above the top gland 228. The springs have annular configurations extending around the valve stem 222. The springs 226 act through the bottom gland 230 to load the packing 212.

The springs 226 are secured in the housing 214 by a packing nut 232. The packing nut 232 is threadedly engaged around the housing 214. Rotation of the packing nut 232 about the axis 220 effects movement of the packing nut relative to the housing in a direction parallel to the axis. The packing bolt 232 has a radially extending inner end surface 234 that is engagable with the top gland 228 to main compressive force on the packing. In the example of FIG. 8, the packing nut 232 includes a plurality of pin openings 262. The pin openings 262 are similar to the pin openings 62 shown on the packing bolt 60 in FIGS. 4 and 5. The tool 70 illustrated in FIG. 4 may be used to apply a selected load to the packing 212 in valve illustrated by FIG. 8.

In use of a tool or method in accordance with the invention, a force versus displacement measurement or curve can be obtained for each type of valve with which the tool is used. The measured result for individual valves can be compared with a known measurement or curve. This comparison can be used to determine whether any parts are missing from the valve, for example, the comparison can be used to determine whether the number of springs in the stack is correct.

Specifically, the apparatus can include a linear scale on the force press that measures displacement during the application of force. When the tool makes contact with the top gland (or the first Belleville spring, in a valve having no top gland), a force registers in the load cell above the tool. The moment the force registers, the PLC send a signal to zero out the linear scale. Then, as increasing force is applied with the tool, the press moves in a downward direction allowing the linear scale to read the displacement of the spring stack. When the force reaches a desired level a theoretical displacement should be reached. If the true (measured) displacement is out of the allowable tolerance, that is an indication that something is wrong with the valve assembly—for example, a missing, extra, or inverted Belleville spring.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

The invention claimed is:

1. An apparatus comprising:
a flow control device comprising:
a housing;
a packing disposed in the housing;
a fastening member assembled with the housing such that the assembled fastening member is moveable with respect to the housing; and
a tool having an engagement member;
wherein the engagement member is insertable into the flow control device through the fastening member to apply a predetermined force to the packing while the fastening member is in an assembled condition with the housing;
wherein the assembled fastening member is moveable with respect to the housing while the engagement member applies the predetermined force to the packing, such that the assembled fastening member is movable to a position that sets a load force applied by the fastening member to the packing based on the predetermined force, and
wherein the engagement member is removeable from the flow control device through the assembled fastening member while the fastening member maintains the load force applied to the packing.

2. The apparatus of claim 1 wherein the tool further comprises a measuring device coupled to the engagement member for measuring the load force applied by the engagement member to the packing.

3. The apparatus of claim 1 wherein the tool further comprises a load applying device coupled to the engagement member that applies force to the engagement member that is transferred to the packing by the engagement member.

4. The apparatus of claim 1 wherein the flow control device comprises a force transfer members disposed between the fastening member and the packing.

5. The apparatus of claim 4 wherein the engagement member is engageable with the force transfer member to apply the load force to the packing.

6. The apparatus of claim 1 wherein the flow control device is a valve.

7. The apparatus of claim 6 wherein the packing seals around a stem of the valve.

8. The apparatus of claim 6 wherein the packing seals around a ball of the valve.

9. The apparatus of claim 6 wherein the tool further comprises a measuring device coupled to the engagement member for measuring the load force applied by the engagement member to the packing, and the tool further comprises a load applying device coupled to the engagement member that applies force to the engagement member that is transferred to the packing by the engagement member, wherein the load measuring device and the load-applying device are in communication such that operation of the load applying device is controlled based on a magnitude of the load force measured by the load measuring device.

10. The apparatus of claim 6 wherein the engagement member is configured to be inserted through a space between a stem of a rotatable flow control element disposed in the housing and said fastening member.

11. The apparatus of claim 6 wherein the engagement member comprises a an array of circular pins.

12. The apparatus of claim 1 further comprising a position measuring device coupled to the engagement member for determining a relative position of the engagement member with respect to the housing.

13. The apparatus of claim 1 wherein the engagement member comprises an elongate tubular member configured to fit into a space between a stem of a rotatable flow control element disposed in the housing and a central opening of said fastening member.

14. The apparatus of claim 13 wherein an outer diameter of the elongate tubular member is smaller than a diameter of said central opening of said fastening member and an inner diameter of the elongate tubular member is larger than an outer diameter of said stem.

15. An apparatus comprising:
a flow control device comprising:
a housing;
a packing disposed in the housing;
a member assembled with the housing at a first position such that the assembled member is moveable with respect to the housing from said first position to a load maintaining position; and
a tool;
wherein the tool is insertable into the flow control device through the member to apply a predetermined load to the packing while the member is in said first position; the assembled member is moveable with respect to the housing from said first position to a load maintaining position that sets a load applied by the member to the packing based on the predetermined load, and the tool is completely removable from the flow control device through the assembled member while the member maintains the load force applied to the packing.

16. The apparatus of claim 15 wherein the tool further comprises a measuring device for measuring the load force applied by the tool to the packing.

17. The apparatus of claim 15 wherein the flow control device comprises a force transfer members disposed between the member and the packing.

18. The apparatus of claim 17 wherein the tool is engagable with the force transfer member to apply the load force to the packing.

19. The apparatus of claim 15 wherein the flow control device is a valve.

20. The apparatus of claim 19 wherein the packing seals around a stem of the valve.

21. The apparatus of claim 19 wherein the packing seals around a ball of the valve.

22. The apparatus of claim 15 wherein a portion of the tool is configured to be inserted through a space between a stem of a rotatable flow control element disposed in the housing and an opening in said member.

23. The apparatus of claim 15 wherein the engagement member comprises an elongate tubular member configured to fit into a space between a stem of a rotatable flow control element disposed in the housing and a central opening of said member.

24. The apparatus of claim 23 wherein an outer diameter of the elongate tubular member is smaller than a diameter of said central opening of said member and an inner diameter of the elongate tubular member is larger than an outer diameter of said stem.

* * * * *

UNITED STATES PATENT AND TRADEMARK OFFICE
CERTIFICATE OF CORRECTION

| | | |
|---|---|---|
| PATENT NO. | : 7,661,184 B2 | Page 1 of 1 |
| APPLICATION NO. | : 10/995711 | |
| DATED | : February 16, 2010 | |
| INVENTOR(S) | : Gary Putnam et al. | |

It is certified that error appears in the above-identified patent and that said Letters Patent is hereby corrected as shown below:

Column 9, claim 11, line 39, please delete "a".

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,661,184 B2  Page 1 of 1
APPLICATION NO. : 10/995711
DATED : February 16, 2010
INVENTOR(S) : Putnam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this

Thirtieth Day of November, 2010

David J. Kappos
*Director of the United States Patent and Trademark Office*